May 27, 1969 J. V. DEREGNAUCOURT 3,447,147

ENCODER

Filed June 3, 1965

Sheet 1 of 9

May 27, 1969 J. V. DEREGNAUCOURT 3,447,147

ENCODER

Filed June 3, 1965 Sheet 3 of 9

United States Patent Office 3,447,147
Patented May 27, 1969

3,447,147

ENCODER

Jacques V. Deregnaucourt, Ottawa, Ontario, Canada, assignor to Northern Electric Company Limited, Montreal, Quebec, Canada Filed June 3, 1965, Ser. No. 461,084
Int. Cl. H04l 3/00; H04j 1/16; H03k 13/00
U.S. Cl. 340—347 4 Claims

ABSTRACT OF THE DISCLOSURE

A variable word length encoder for a pulse code modulation multiplex telephone system in which pulse amplitude modulated signals are encoded in a pulse code modulation preferably binary, with the least significant digit being transmitted first and with an end-of-word signal provided to indicate the last significant digit of the pulse code. The encoder includes means to inhibit encoding when the input signal is less than a predetermined value thus saving the operating time of the encoder for zero level signals.

The present invention relates to an encoder for use in a variable word length pulse code modulation multiplex telephone system. The present invention is particularly useful in a system as disclosed in United States patent application Ser. No. 372,723, filed June 4, 1964, entitled Asynchronous Pulse Code Modulation System. As described in that patent application, an asynchonous pulse code modulation (PCM) system is one wherein a plurality of telephone conversations on individual channels are sampled at a high sampling rate to obtain pulse amplitude modulated signals representative of the conversations on each of the channels. These pulse amplitude modulated (PAM) signals are then pulse code modulated into a binary code with the least significant digit first and with additional telephone information transmitted as a bipolar signal. In this asynchronous PCM system only the significant (non-zero) digits of each channel are transmitted and the transmission of the signal from a succeeding channel is started as soon as the signal from the preceding channel has been completely transmitted. Accordingly with this system approximately 48 channels may be encoded on a single cable pair whereas with a synchronous PCM system only 24 channels may be carried on a cable pair. In the system with which the present invention is concerned, the code used to transmit the signal on each channel consists of one sign digit plus up to six level or value digits. The least significant digits are transmitted first so that the non-significant digits are left at the end of the word. Reference is made to the application aforesaid for further details regarding the system construction and operation; the disclosure of the aforesaid application being included herein by reference.

An object of the present invention is to provide a variable word length encoder for a PCM multiplex telephone system which transmits the least significant digit first and which also inserts the appropriate end of word signal, and "on hook" and "off hook" signal into the binary message which is transmitted by the bipolar converter on the transmission channel.

A further object of the present invention is to provide an encoder which may use a digit-at-a-time analog-to-digital converter to replace a word-at-a-time analog-to-digital converter.

Another feature of the present invention is the provision of means whereby signals with an amplitude less than the minimum step of the analog-to-digital encoder may be encoded without use of the encoder.

A further object of the present invention is the provision of means whereby encoding may be inhibited when the amplitude of the signal is less than the smallest step which the encoder can encode.

Figure 1:
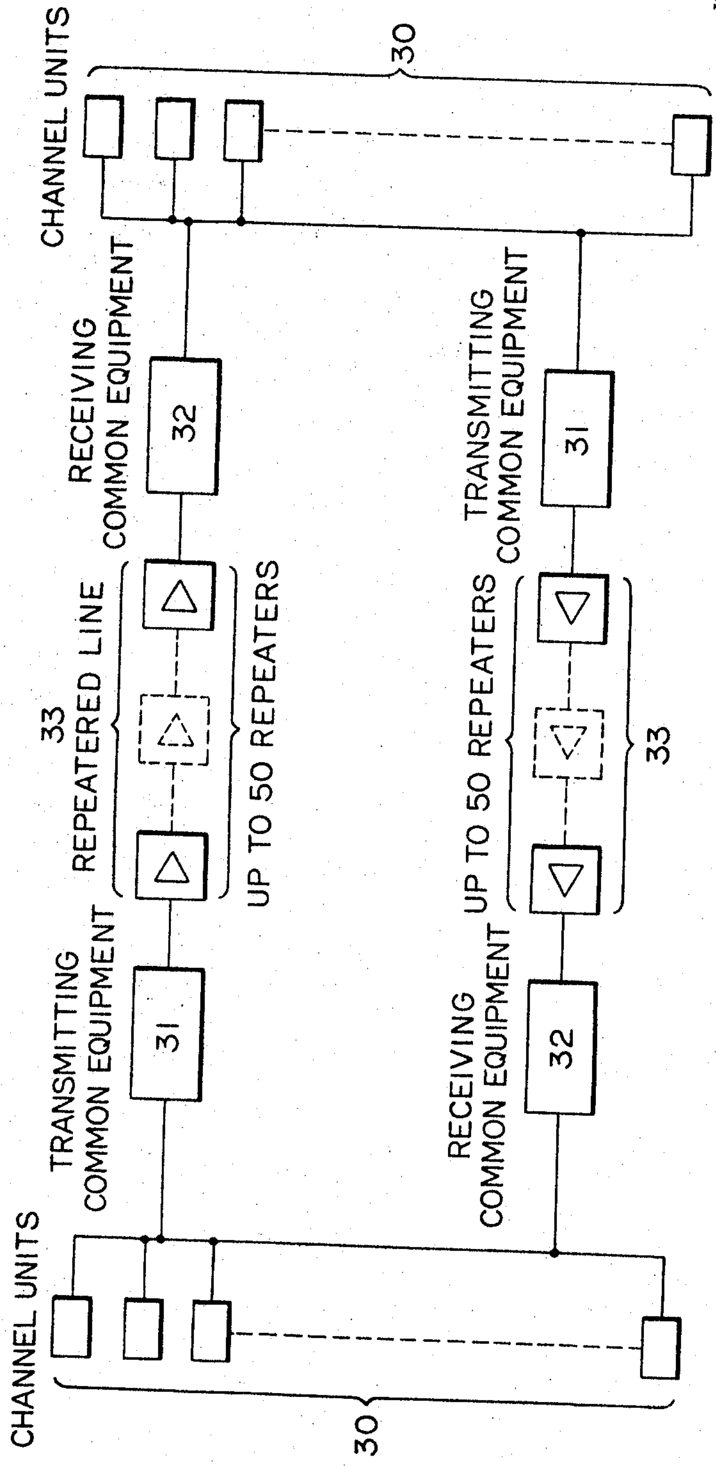
Figure 2:
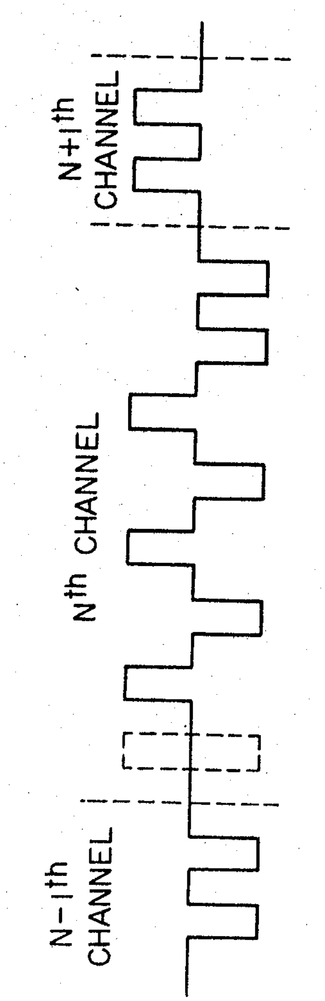

In drawings which illustrate the present invention and the system in which it is used;

FIGURE 1 is a block diagram of an asynchronous pulse code modulation system in which the encoder of the present invention may be used, FIGURE 2 is a diagram illustrating the signals on three channels of a pulse code modulation system at an arbitrary time period.

Figure 3:
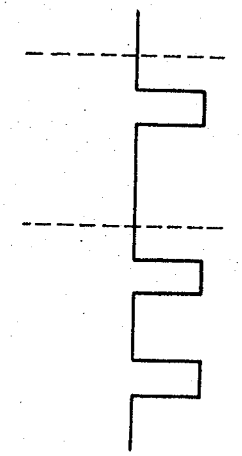
Figure 4:
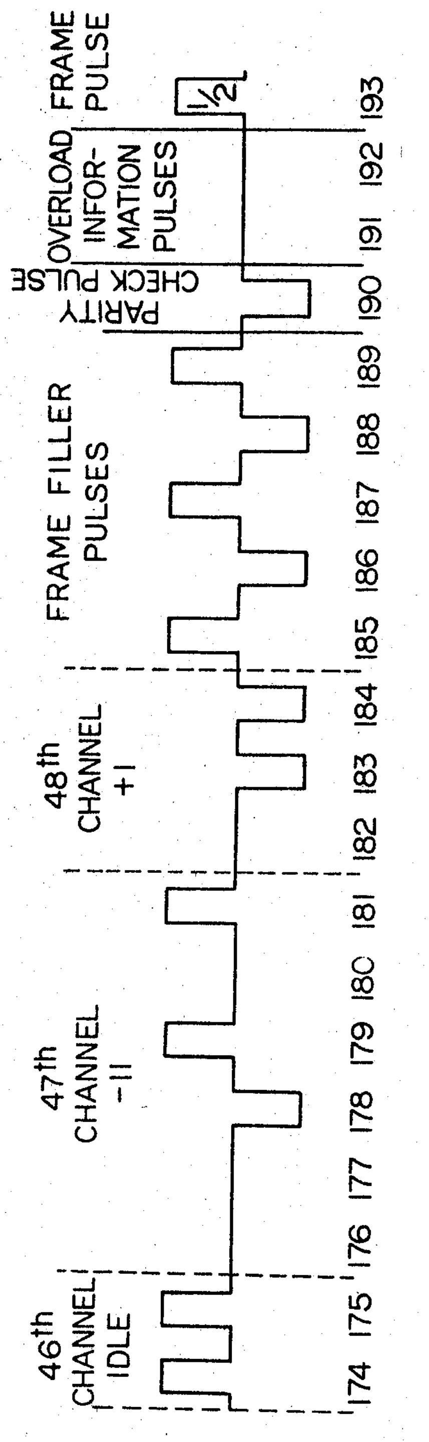
Figure 5:
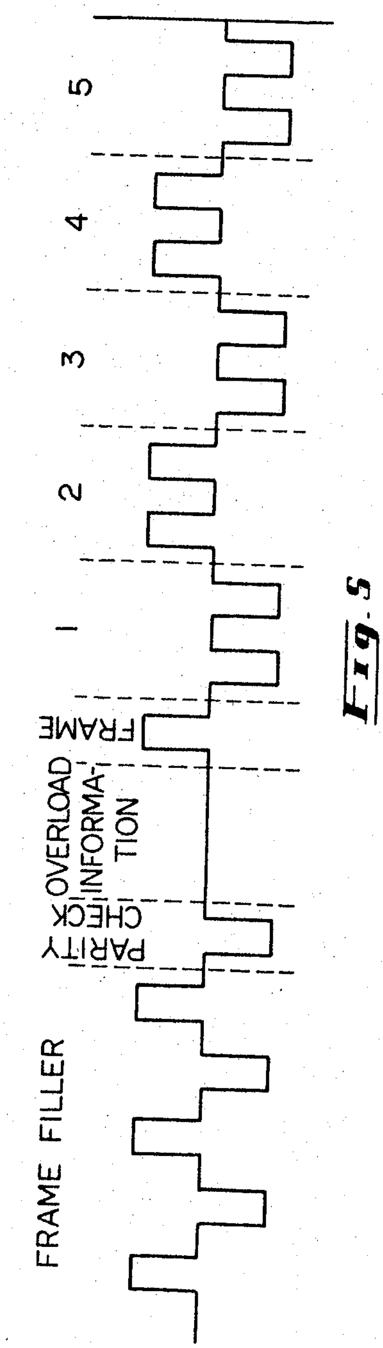
Figure 6:
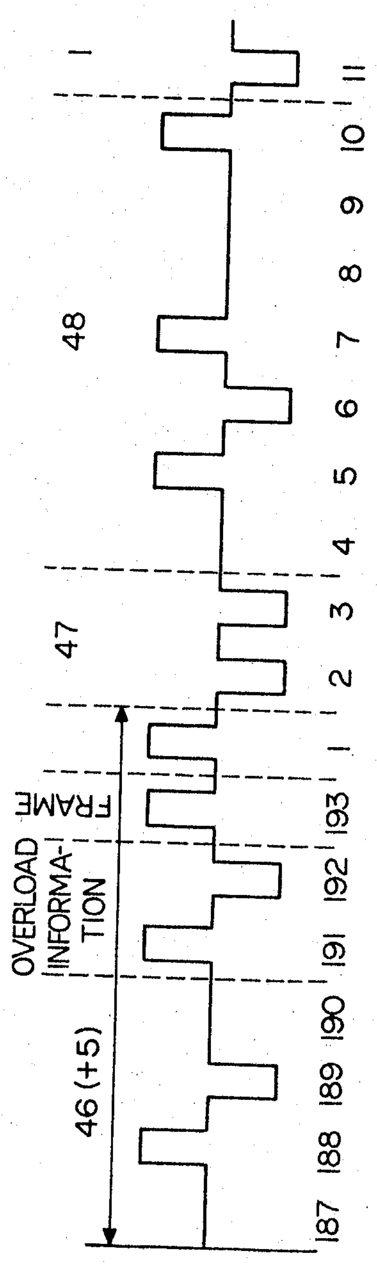
Figure 7:
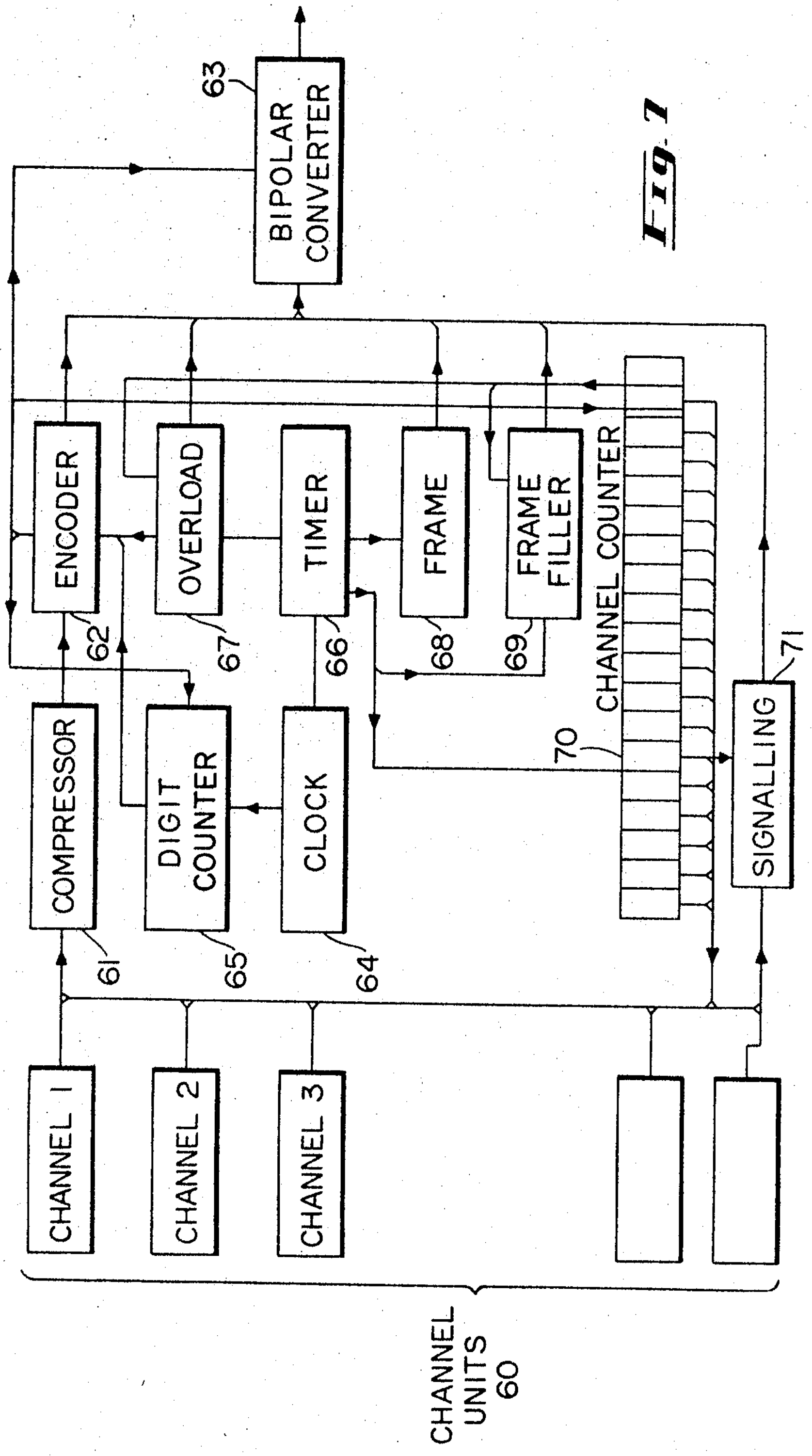
Figure 8:
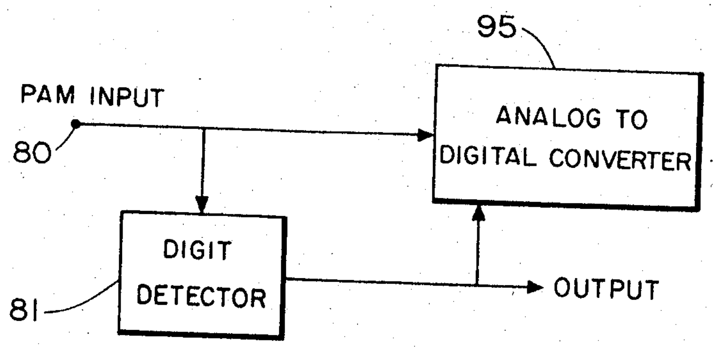
Figure 9:
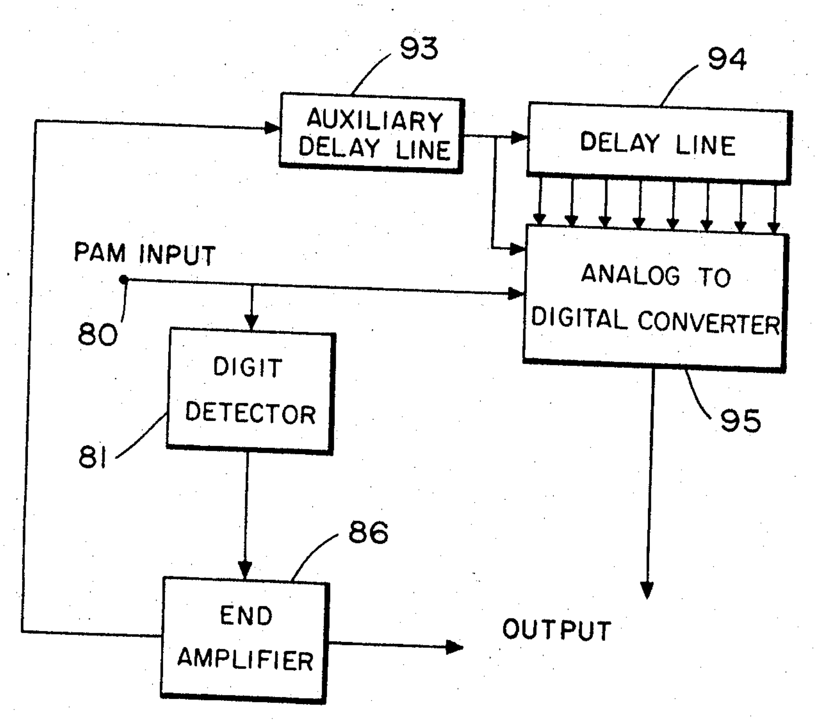
Figure 10:
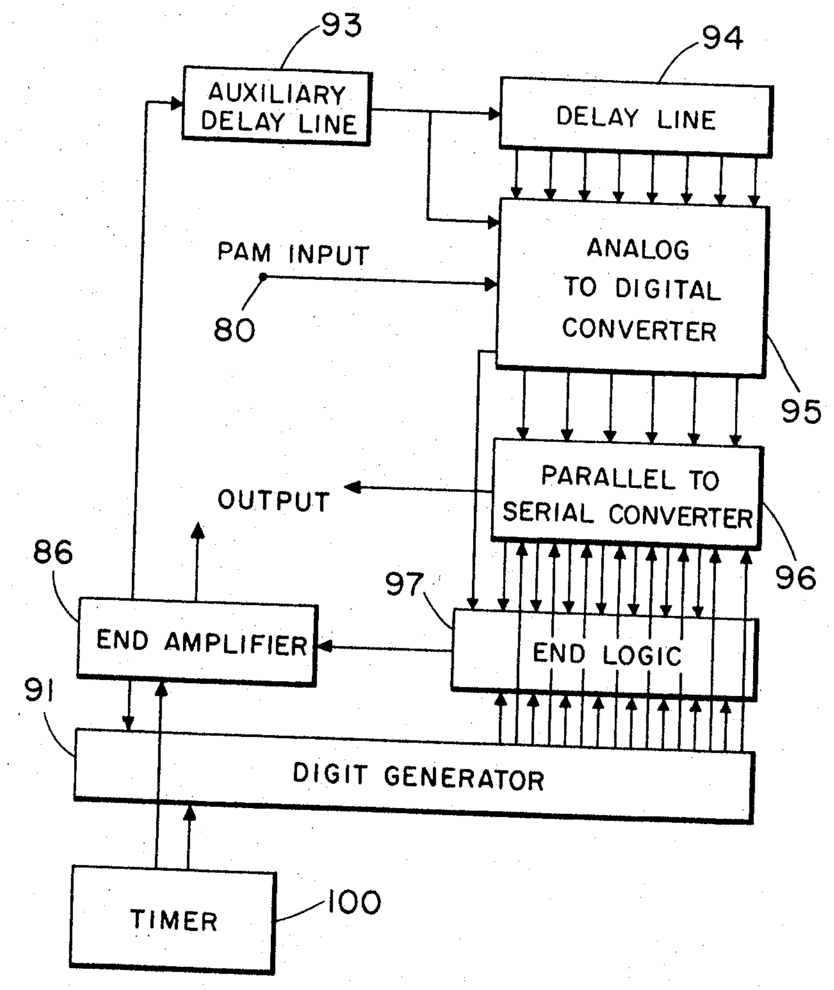
Figure 11:
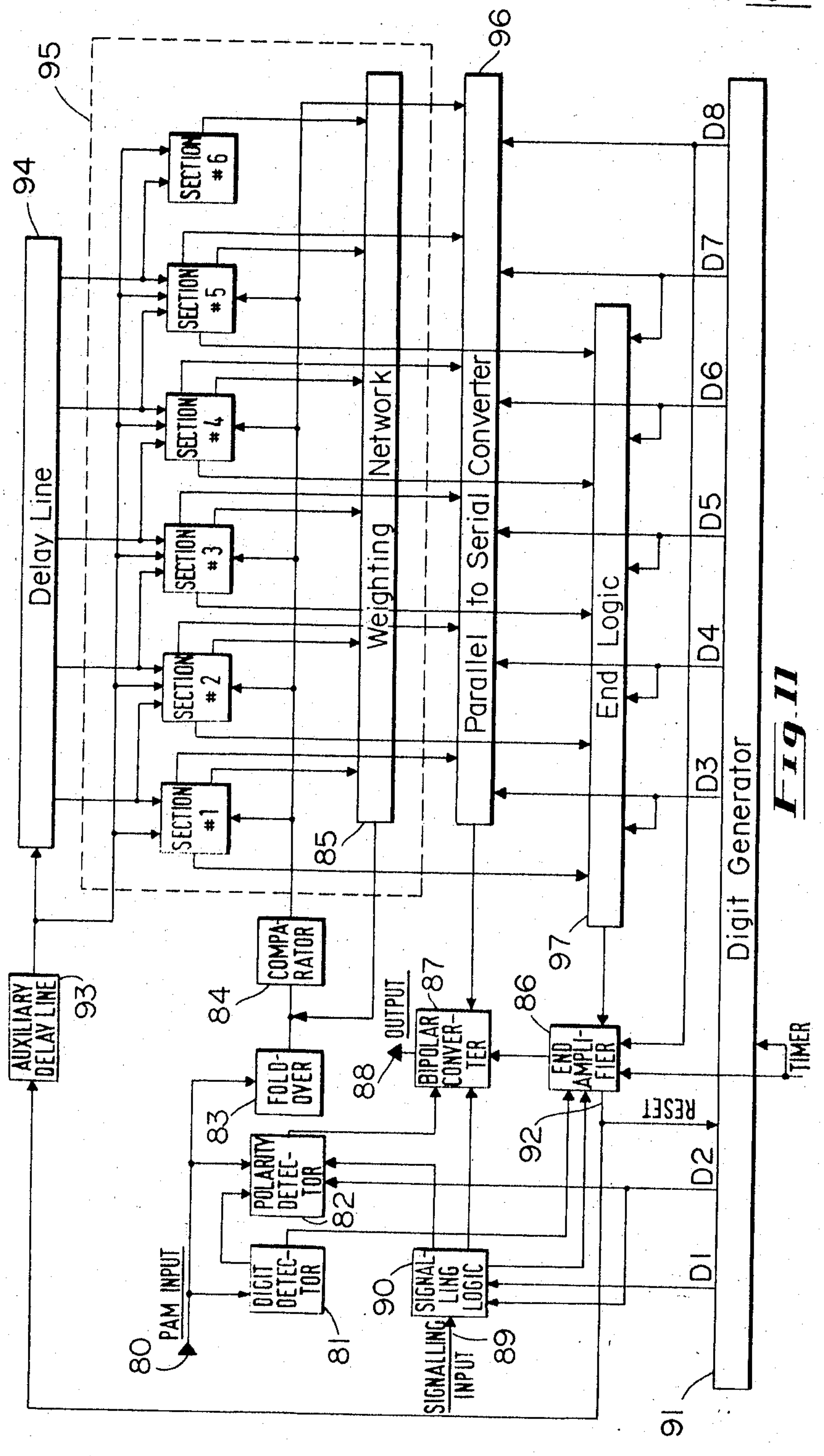
Figure 12:
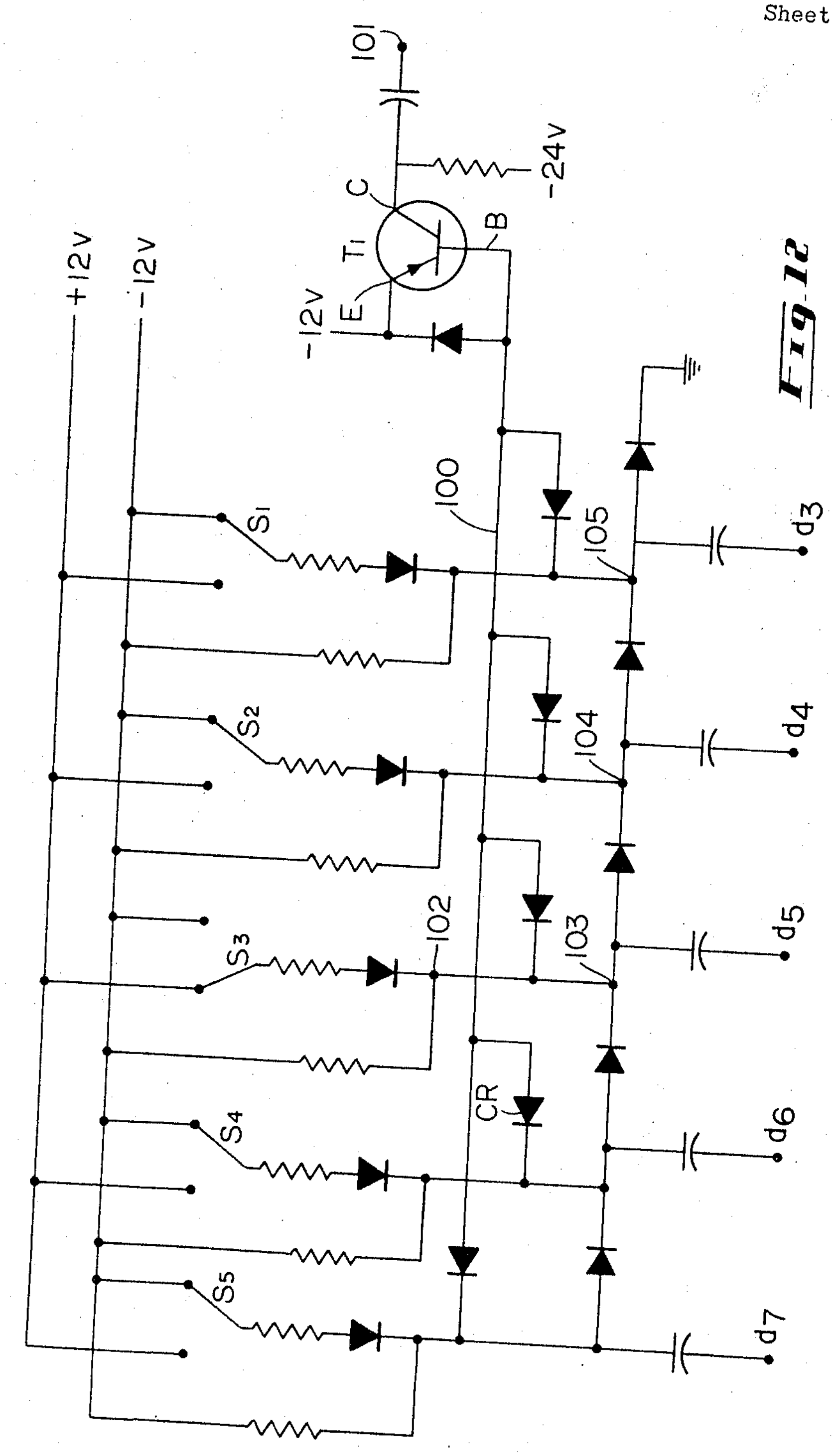

FIGURE 3 illustrates the PCM signal on an in-use channel with zero amplitude PAM signal, FIGURE 4 is a partial timing diagram showing the last three channels of a frame plus the end-of-frame information, FIGURE 5 shows the last portion of a frame under low load conditions, FIGURE 6 illustrates an overload, FIGURE 7 is a block diagram of transmitting equipment of an asynchronous pulse code modulation system in which the encoder of the present invention is used, FIGURE 8 is a block diagram of a simplified analog-to-digital converter using the digit detector of the present invention, FIGURE 9 is a block diagram of a simplified analog-to-digital detector which operates asynchronously, FIGURE 10 is a more detailed block diagram of an encoder in accordance with the present invention, FIGURE 11 is a block diagram of a variable word length encoder constructed in accordance with the present invention, and FIGURE 12 is a schematic diagram of an end logic circuit.

In order to explain the construction and operation of an encoder in accordance with the invention, the operation of an asynchronous pulse code modulation system having 48 channels with an 8 digit channel word and 193 pulses in a frame, will be described. The code used to transmit the sample signal in each channel consists of a signalling digit, a sign digit, and up to six level or value digits, the least significant digits being transmitted first. The pulse train being transmitted by the equipment is made up of frames, there being approximately 8,000 frames per second, each frame being divided into 193 time slots. This number is arbitrary and is controlled by the characteristics of the repeaters used in the transmission line which in present systems are set to operate at approximately 1.544 megacycles per second.

It will be appreciated that the encoder of the present invention, while being capable of operation in the system defined above will also find use in other systems wherein the number of pulses in a frame, the polarity indicated by the presence or absence of the sign digit, the number of digits, and all other specific factors of the system differ from those mentioned.

In the system chosen for purposes of illustration, the code words corresponding to the 48 channels cannot be separated by time or pulse counting since their length is variable. Accordingly an end mark is provided to indicate the end of a channel word. This end mark is obtained by altering the polarity of the last pulse of the word. Usually the polarity of the pulse is governed by the bipolar law, that is, two successive pulses may not have the same polarity. The last pulse of a word does, however, have the same polarity as the previous pulse. This "error" indicates to the receiver that the word is finished. The first time slot of a channel word indicates the signalling state of the channel. The on-hook or idle condition is shown by the presence of a pulse, the off-hook or in use condition is shown by no pulse in this time slot. The second time slot relates to the sign of the message signal corresponding to this channel. When the amplitude of the signal is zero, the sign pulse is forced to be present in order to carry the "end of word" mark since no other pulses are to be transmitted. The remaining pulses in the channel word indicate the absolute value of the signal in binary form. The 193rd pulse of a frame, which is the last one, is devoted to framing information. This pulse is modulated by a 4 kc./s. square wave, in other words every second pulse is present. Pulses 191 and 192 represent overload conditions in the system. Slight overload is indicated by pulse 191 being present and heavy overload by both pulses 191 and 192 being present. Pulse 190 is a serial parity check and is used when no overload is present to check the quality of transmission in the repeatered line. The type of repeatered line for which this system is designed is similar to that of a T–1 carrier system as used by the Bell Telephone System in North America and is composed of a cable pair with self-timed, regenerative repeaters spaced every 6000 feet along the cable pair. Each repeater consists of a pre-amplifier, clock and a pulse generator, and regenerates and amplifies the received pulse train.

FIGURE 1 illustrates a pulse code modulation multiplex telephone system in which the encoder of the present invention may be used. As shown, a plurality of channel units 30 are connected to transmitting common equipment 31 and receiving common equipment 32. The transmitting common equipment includes the encoder and encodes the conversations from the channel units 30 for transmission on the repeatered line 43 to the receiving common equipment 32. The receiving common equipment 32 decodes the encoded pulse code modulation signals to amplitude signals which are then fed to the channel units and to the subscribers at the receiving end of the link.

FIGURE 2 illustrates the signal on the Nth channel of a pulse code modulation system using the encoder of the invention. The signal represented in the Nth channel in FIGURE 2 is a positive signal of maximum amplitude in which each time slot of the channel except the first one is used for the transmission of pulse code information. The first pulse of each channel is a signalling pulse indicating whether or not the channel is in use (off-hook) or is idle (on-hook). This time slot could also be used for any other signalling information. The second time slot in the Nth channel indicates the sign of the pulse amplitude modulation sample encoded, the presence of a pulse in the illustrative system indicating a positive signal and the absence of a pulse indicating a negative signal. The sign bit is also used as will be later explained when a channel is idle to transmit the end of word information. The remaining positions of the channel indicate in binary form the absolute value (regardless of sign) of the pulse amplitude modulation signal encoded in the channel. It will be noted that the signal is transmited bipolarly; that is, each pulse has the opposite polarity to the preceding pulse except for the last pulse of a channel which has an "incorrect" polarity to indicate the end of the channel word. Thus, the second pulse of a pair of pulses of the same polarity indicates the end of the word and this may be seen in the illustration of the $N-1$th channel where the second negative pulse shown indicates the end of the word in that channel; in the Nth channel where the second negative pulse at the end of the word similarly indicates the end of the Nth channel word, and in the $N+1$th channel which is idle, where the presence of the two positive pulses indicates first of all that the channel is idle and secondly the end of the word for that channel. It will be seen that except of the "end of word" marks in the PCM signal that the pulses are transmitted bipolarly so that the first pulse of the Nth channel is positive since the last pulse of the $N-1$th channel is negative. Similarly the first pulse of the $N+1$th channel is positive because the last pulse of the Nth channel is negative.

FIGURE 3 is a diagram similar to FIGURE 2 showing a typical channel which is in use (off-hook) and in which the PAM amplitude is less than the smallest step of the encoder. It will be noticed that the first pulse position of the channel is not occupied since the channel is in use and that the sign digit is present and has the same porality as the preceding pulse in the frame. Thus, the sign digit serves as an "end of word" mark to identify the channel and the channel will be properly decoded with a zero amplitude signal.

FIGURE 4 illustrates the last three channels of a frame during a condition in which not all the capacity of the system is in use. It will be seen that the 46th channel is idle as indicated by the positive pulses in the 174th and 175th time slots the 47th channel is carrying a binary coded signal indicating that the amplitude of the sample for that channel is −11. This is indicated by the fact that the 176th time slot is empty showing that the 47th channel is in use. The 177th slot is empty showing that the signal in the sample is negative and the pulses in the 178th, 179th and 181st time slots indicate that the absolute value of the channel signal is 11, the binary number 1011 being the binary equivalent of the decimal number 11. It will also be noted that the least significant digit of the binary number is transmitted first so that in fact the amplitude of the signal is transmitted as 1101 rather than as 1011. It will also be noted that the 181st pulse is of the same polarity as the 179th pulse and accordingly constitutes the end of work mark for the 47th channel. The 48th channel is also in use which fact is indicated by the absence of the 182nd pulse. A pulse in the 183rd time slot indicates that the signal is positive and the pulse in the 184th time slot indicates that the value of the signal is 1 and also indicates the end of a word. The frame filler pulses in time slots 185–189 are used merely to fill up all available time slots in the frame when the 48th channel is completely encoded before pulse 189 is reached. Pulse 190 is used for a serial parity check when the transmission system is slightly loaded. Pulses 191 and 192 are used to indicate the presence of overload conditions and pulse 193 which is present only in alternate frames provides framing information to the decoding equipment.

FIGURE 5 illustrates the end of one frame and the beginning of a subsequent frame under very low utilization conditions and it will be seen that the first five channels of the new frames are vacant, each channel containing a pair of pulses of like polarity, the first pulse in each frame indicating the on-hook condition and the sign pulse indicating the end of word.

FIGURE 6 illustrates a condition of overload in which the 46th channel extends beyond the 193rd pulse and the encoding of the 47th and 48th channels extends into the first ten times positions on the subsequent frame. It will be noted that in the 46th channel the overload information and the frame information do not form part of the channel signal, however the final pulse of the 46th channel which is the first pulse of the succeeding frame is of the same polarity as the 193rd pulse indicating the end of the 46th channel.

Means are included in the system which are not detailed here for overcoming such overload conditions and for restoring the channel framing situation so that the 48th channel occurs before the 193rd pulse.

FIGURE 7 is a block diagram illustrating the transmitting common equipment characterized as reference numeral 31 FIGURE 1. As shown the transmitting common equipment consists of a number of individual channel units 60 which apply their signals sequentially to a compressor 61, an encoder 62 and a bipolar converter 63. The apparatus is timed by a clock 64 which drives a digit counter 65 and a timer 66. An overload sensor 67 is provided which detects overload conditions. A frame pulse generator 68 and a frame filler 69 are provided for generating framing information and for filling frames when equipment utilization is low. A channel counter 70 is also provided as well as a signalling circuit 71. The encoder 62 which is the subject of this application is detailed in the subsequent description.

As shown in FIGURE 8 a pulse amplitude modulated input (PAM input) is applied at terminal 80 of an encoder and this input is connected to the digit detector 81 and the analog-to-digital converter 95. The digit detector 81 gives an output whenever the PAM input is less than the minimum step of the analog-to-digital converter 95. The output from the digit detector 81 may be used directly as the output of the encoder where the PAM amplitude is smaller than the smallest step of the analog-to-digital converter or the output from the digit detector 81 may be used to inhibit the operation of the analog-to-digital converter 95 to prevent operation of the encoder when a zero amplitude PAM input is received. In accordance with a further feature of the present invention the output of a digit detector may be connected to other circuits so that a composite PCM signal may be generated directly when the digit detector 81 is operated to save the time required for operation of the analog-to-digital converter 95 when a zero level PAM input is received. It will be appreciated that this saving in time is very significant where an appreciable number of channels are idle in a PCM system and thus the system capacity is further extended by the use of the digit detector of the present invention. It will be appreciated that the digit detector of the present invention may be used with any form of analog-to-digital converter whether associated with a pulse code modulation voice transmission system or with any other form of data transmission involving the conversion of analog signals to digital form.

FIGURE 9 is a simplified schematic diagram of an asynchronous PCM encoder in which the digit detector of the present invention is incorporated thereby increasing the capacity of the encoder. As before the PAM input is applied at the terminal 80 and is fed from this terminal to the digit detector 81 and to the analog-to-digital converter 95. As before the digit detector 81 provides an output when the PAM input amplitude is less than the least step of the analog-to-digital converter 95. The output from the digit detector 81 is fed to the end amplifier 86 which generates an "end of word" signal and also generates a signal which is fed to the auxiliary delay line 93 to reset the analog-to-digital converter 95 to initiate encoding of a succeeding pulse amplitude modulated input. The pulse from the auxiliary delay line 93 is also fed to the delay line 94, and the outputs from the delay line 94 control the timing of the analog-to-digital converter 95. The end amplifier 86 generates an output (not shown) for gating the next PAM input to the terminal 80.

FIGURE 10 is a simplified schematic diagram in block form of an encoder constructed in accordance with the present invention which uses a digit at a time, or serial analog-to-digital converter, together with a parallel-to-serial converter to generate a pulse code modulated output from a pulse amplitude modulated input; in which the output from the encoder consists of serial digits with the least significant digit transmitted first and with the encoding of a succeeding PAM input commencing immediately the encoding of the preceding input is completed. The operation of the circuit shown in FIGURE 10 is as follows. The end amplifier 86 provides an output pulse which is fed to the auxiliary delay line 93 and from which this pulse is fed to the delay line 94 and directly into the analog-to-digital converter 95 to reset the converter for encoding of a PAM input. An input on terminal 80 is fed to the analog-to-digital converter 95 and is converted to a digital signal which is fed to the parallel-to-serial converter 96 where it is stored to be read out when the parallel-to-serial converter 96 is energized by the digit generator 91. The timer 100 provides timing pulses to the digit generator and to the end amplifier 86 to control the timing of all pulses within the equipment. Pulses from the digit generator 91 are fed in sequence to the parallel-to-serial converter 96 to provide the output from the parallel-to-serial converter and to energize the end logic circuit 97 to provide an output when the encoded value of the PAM input has been read out of the parallel-to-serial converter 96. The output from the end logic circuit is fed to the end amplifier 86 which also provides an end of word output which may be combined in ancillary equipment with the output from the parallel-to-serial converter 96 to form a pulse code modulated signal as detailed hereinbefore. Additional outputs from the end amplifier 96 then reset the digit generator 91 and energize the auxiliary delay line 93 to start coding of the next PAM input.

FIGURE 11 is a schematic block diagram illustrating the structure and operation of an encoder in accordance with the present invention. The pulse amplitude modulated (PAM) input to the encoder is applied at the terminal 80 and is fed from this terminal to the digit detector 81, the polarity detector 82, and the fold over circuit 83. From the fold over circuit 83 the PAM input is fed to the comparator 84 where it is compared with voltages generated by the weighting network 85 during encoding. It will be recalled that the PAM input is a pulse whose amplitude represents the instantaneous value of the signal from an individual channel of the multiplex system. If the amplitude of this signal is less than the smallest step of the encoder the digit detector 81 provides an output to the end amplifier 86 and to the polarity detector 82 so that the bipolar converter 87 will generate an output at terminal 88 of the type shown in FIGURE 3. That is, the signalling digit will not be present since the channel is in use and the polarity digit will have the same polarity as the last transmitted digit of the preceding channel, to indicate the end of a channel word. The bipolar converter 87 which is not part of the invention is a circuit which on receipt of inputs from the various encoder portions, transmits pulses bipolarly unless the alternate polarity of the pulses is inhibited as by an end of word mark making the polarity of the last pulse in the word, the same as the polarity of the preceding pulse.

The PAM input on the terminal 80 is applied only to the digit detector 81, the polarity detector 82, the fold over circuit 83, and the comparator 84. All other circuits and connections in the encoder do not handle amplitude signals and are solely switching circuits operating on pulses.

When a channel is not in use (idle) a signalling input at the terminal 89 operates the signalling logic circuit 90 which is driven by the first digit output from the digit generator 91. When a channel is not in use the signalling logic circuit 90 allows the pulse on line D1 in the first time slot of the channel to drive the bipolar converter 87 and hence this pulse appears at terminal 88 in the first time slot of the channel. It will be appreciated that digit generator 91 generates a sequence of 8 pulses in the illustrative system and automatically resets itself at the end of 8 pulses and may also be reset by the end of word signal from the end amplifier 86 at any time. In general there will be no PAM input at the terminal 80 and accordingly during the second digit period the polarity detector 82 will pass the pulse at time D2 from the digit generator 91 to the bipolar converter 87. At the same time the digit detector 81 will have detected the absence of an input at the terminal 80 and will send a signal to the end amplifier 86 and to the polarity detector 82 to inhibit the bipolar converter 87 during the second digit time D2. Consequently a second pulse in the "polarity digit" time will appear at output 88, this pulse having the same polarity as the pulse appearing in the first digit time. The appearance of this signal will be for example as shown for channels 2, 3, 4, and 5 in FIGURE 5.

If accidentally there were a PAM pulse at the input 80 it could be encoded uselessly; to avoid this a signal from the signalling logic 90 to the end amplifier 86 and the polarity detector 82 overrides the signal from the digit detector 81. The end amplifier 86 also generates an output at terminal 92 which resets the digit generator 91 and is also fed through auxiliary delay line 93 to the main delay line 94 sequentially to operate the stages of the analog-to-digital converter 95. The analog-to-digital converter 95 serves to generate in sequence, as controlled by the delay line 94, a plurality of weighted amplitude signals which are compared to the PAM input in the comparator 84 and, depending on the results of this comparison, provides outputs to control the state of a series of electronic switches in the parallel to the serial converter 96. The parallel-to-serial converter 96 thus serves to store in parallel form the results of the comparison between the outputs of the analog-to-digital converter 95 and the PAM input on line 80. The contents of the parallel-to-serial converter 96 can then be scanned sequentially, least significant digit first, to generate the binary code indicative of the amplitude of the PAM input. The analog-to-digital converter 95 also feeds a plurality of outputs to the end logic circuit 97 to control the state of switches in this end logic circuit 97 so that the end of word mark will be generated by the bipolar converter 87.

The analog-to-digital converter 95 is a conventional design of converter and operates in the conventional manner by generating a plurality of weighted voltages which are then compared by the comparator 84 with the PAM input. Commonly this comparison takes place by subtracting one voltage from the other starting with the largest increment of the voltages generated by the weighting network 85. Depending upon the results of this comparison, the individual sections of the analog-to-digital converter 95 provide outputs to the parallel-to-serial converter 96 and to the end logic circuit 97, so that when the contents of the parallel-to-serial converted 96 is examined (least significant digit first), it will provide signals to the bipolar converter 87 will control the operation thereof to provide the proper bipolar binary digital signal representing the amplitude of the PAM input. The end logic circuit 97 will be explained in more detail hereafter, but for purposes of discussion of FIGURE 11, it consists of a plurality of inter-connected gates which are examined sequentially, providing an output for every digit generated by the digit generator subsequent to the last but one non-zero digit of the output of the parallel-to-serial converter 96. The end logic output is fed to the end amplifier 86 which in turn inhibits the polarity switch of the bipolar converter 87, resets the digit generator 91 and passes a pulse to the auxiliary delay line 93 to control the timing of the next encoding. It will be appreciated that the time during which encoding of the PAM input takes place is very limited and this encoding must take place during two digit times of the binary output, that is, at the end of the polarity digit, the PAM input must be completely encoded so that the digit generator may scan the parallel-to-serial converter 96 and the end logic circuit 97 and generate the binary signal indicative of the amplitude of the PAM signal. Additionally when a zero amplitude signal is to be encoded there is no time for the encoder 95 to encode the signal and the digit detector 81 is used directly to give an end output when a zero amplitude input is received.

The beginning of the encoding process is initiated by the end mark of the previous channel word which is sent to the auxiliary delay line 93 and which resets the digit generator 91. Additionally, although not shown in FIGURE 8, the output from the end amplifier 86 initiates the sampling of the amplitude signal in the next channel encoded and thus a PAM input appears at the terminal 80. A certain lapse of time is required for this PAM input to reach its steady value and the auxiliary delay line 93 provides the required delay. Also during the same time delay all sections of the encoder 95 are reset by the output of the end amplifier 86. The encoder is driven through the delay line 94 which contains a tap for all but one of the sections of the encoder. The first tap is connected so that a signal appearing there will reset the trigger of the first section of the encoder and will set the trigger of the second section as well. The other taps are connected to the succeeding sections of the encoder except that the last section has no reset trigger. Section No. 6 of the encoder does not need a reset, as at the time when it should be turned off the state of the comparator output 84 represents the corresponding digits, so it is not necessary to give the section its definitive state and the code is fully available sooner since there is no delay during the switching time of the last section. This yields a saving in delay line components as well. The sum of the delay from the auxiliary line 93 and the main delay line 94 is a little bit less than three clock-periods of the timer. This delay allows for the rise time and operating time of the various amplifiers and the comparator 84. When the encoding process is finished the digit generator 91 is about to send the third digit D3, having already transmitted the on-hook and polarity digits D1 and D2. The first output pulse of the digit generator used for generating the binary code indicative of the PAM amplitude D3 is directed to the first section of the parallel-to-serial converter 96 which has been set by the output of the analog-to-digital converter 95. If the least significant digit is a 1, the pulse at D3 will be transmitted to the bipolar converter 87. If the least significant digit is a 0, then no pulse will be transmitted to the bipolar converter 87 during the D3 digit time. The same pulse, D3, is also directed to the first section of the end logic circuit 97, which section is driven by the second last section of the encoder 95. This section will pass the digit D3 to the end amplifier 86 if the fifth section of the encoder and all the preceding sections, i.e., fourth, third, second and first are set to a zero state, that is if the first digit of the binary code is the only one to be sent. The digits D4, D5, D6, D7, and D8 from the digit generator 91 are similarly supplied to the parallel-to-serial converter 96 and the end logic circuit 97 to drive the bipolar converter 87 and the end amplifier 86 respectively. When an output is obtained from the end logic circuit 97 the digit generator is reset by the end signal from the end amplifier 86 and a new cycle begins.

All circuits used in the encoder illustrated in FIGURE 11 are of conventional design and will not be further described as their structure and operation will be familiar to those skilled in the art of pulse code modulation.

However, in order to understand the operation of the circuit of FIGURE 11 more thoroughly the structure of an end logic circuit is shown in FIGURE 12. In FIGURE 12 there is illustrated a practical end logic circuit consisting basically of a transistor T1 of the PNP type which is biased to a cut-off condition by the −12 volts applied to its emitter E. In order to turn the transistor on a voltage greater than −12 volts is applied to the base B of the transistor T1. A plurality of input terminals *d*3, *d*4, *d*5, *d*6 and *d*7 are provided which correspond to the digits D3, D4, D5, D6 and D7 of the digit generator 91 of FIGURE 11. The input pulse on the terminals *d*3, *d*4, *d*5, *d*6 and *d*7 are pulses of −12 volts amplitude which is insufficient to turn on the transistor T1 unless the bus 100 is already at a potential of minus 12 volts due to a setting of one of the switches S1, S2, S3, S4 or S5. The switches S1 to S5 represent schematically electronic switching circuits which are set to one of the two alternative states by the outputs from the analog-to-digital converter 95 (FIGURE 11) during encoding of the PAM input. Thus if digit D3 were to be the last digit of a channel word, an input pulse of −12 volts at terminal *d*3 would cause the bus 100 to become more negative than −12 volts and accordingly the transistor T1 would be turned on and would provide an output at its collector C, which output would appear at terminal 101 and would be fed to the end amplifier 86 in FIGURE 11 to signal the end of word. It will be appreciated that no special circuitry is required for generation of the end of word signal for the last digit in a channel word, since this last digit will always be an end of word signal when it is present. Similarly no instance will arise where the end logic circuit of FIGURE 12 will be required to generate an end of word signal before the third digit, this being accomplished by other circuitry shown in FIGURE 11.

Basically the operation of the circuit in FIGURE 12 depends on whether or not the bus 100 is maintained at −12 volts, or at a lesser negative voltage. Thus, for example, if switch S3 is in the position shown in FIGURE 12, the point 102 will be at a voltage considerably positive from −12 volts and accordingly the point 103 and the points 104 and 105 will be substantially at ground potential. Accordingly a −12 volt pulse at terminals *d3*, *d4*, or *d5* will not drive the bus 100 far enough negative to turn on the transistor T1. However, a pulse of −12 volts at point *d6*, will drive the bus 100 through the diode *Cr* to a point where the transistor T1 will be turned on and an end of word mark will be generated.

It will be appreciated that numerous modifications may be made to the present invention in regard to the nature of the specific form of circuits used for various portions of the encoder and accordingly the present invention is not to be construed narrowly as being restricted to a particular form of circuit but is to be considered broadly, the scope of the invention being commensurate with the generality of the foregoing disclosure particularly with respect to FIGURES 8, 9, 10 and 11 of the drawings.

I claim:

1. An encoder for a variable word length pulse code modulation multiplex telephone system for encoding pulse amplitude modulation signals as pulse code modulation comprising an analog-to-digital converter to which said pulse amplitude modulated signals are fed, a parallel-to-serial converter connected to said analog-to-digital conveter and conditioned in parallel thereto, a digit generator adapted to generate a plurality of sequential digits which energize said parallel to serial converter to give a serial output corresponding to the parallel input thereto with the least significant digit being read out first, and an end logic circuit connected to and conditioned by said analog-to-digital converter and energized by said digit generator to give an end of word signal at the time the last non-zero digit is read out of said parallel-to-serial converter, said end logic circuit providing an end of word pulses to reset said digit generator and said analog-to-digital converter and to signal the end of the encoded signal.

2. An encoder as claimed in claim 1 and further comprising an input for a pulse amplitude modulated signal to be encoded, means responsive to said pulse amplitude modulated signal for generating an output depending on the polarity of said signal, means for converting said signal to a unidirectional signal, said unidirectional signal being fed to said analog-to-digital converter for encoding said sampled signal as a binary number to be transmitted serially, least significant digit first.

3. Apparatus according to claim 2 including means for inhibiting the operation of said analog-to-digital converter, to reset said digit generator, and to cause said end logic circuit to give an end of word signal if the amplitude of said sampled signal is less than a predetermined value.

4. An encoder as claimed in claim 1 for encoding the amplitude of a sampled signal as a serial binary number with the least significant digit being the first digit in said number said analog-to-digital converter including a comparator, means for generating a plurality of amplitude signals to be compared in said comparator, means for storing outputs from said comparator indicative of the result of each comparison.

References Cited

UNITED STATES PATENTS

| | | | |
|---|---|---|---|
| 2,811,713 | 10/1957 | Spencer | 340—347 |
| 2,946,044 | 7/1960 | Bolgiano et al. | |
| 3,216,003 | 11/1965 | Funk et al. | 340—347 |
| 3,320,534 | 5/1967 | Altonji | 325—38 |

MAYNARD R. WILBUR, *Primary Examiner.*

J. GLASSMAN, *Assistant Examiner.*

U.S. Cl. X.R.

179—15